US010540346B2

(12) United States Patent
Martin et al.

(10) Patent No.: US 10,540,346 B2
(45) Date of Patent: Jan. 21, 2020

(54) OFFLOADING CONSTRAINT ENFORCEMENT IN A HYBRID DBMS

(71) Applicant: International Business Machines Corporation, Armonk, NY (US)

(72) Inventors: Daniel Martin, Stuttgart (DE); Andreas Brodt, Gerlingen (DE); Oliver Schiller, Dettingen (DE); Felix Beier, Holzgerlingen (DE); Knut Stolze, Hummelshain (DE)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 15/691,960

(22) Filed: Aug. 31, 2017

(65) Prior Publication Data
US 2019/0065495 A1    Feb. 28, 2019

(51) Int. Cl.
*G06F 16/00* (2019.01)
*G06F 16/23* (2019.01)
*G06F 9/46* (2006.01)

(52) U.S. Cl.
CPC .......... *G06F 16/2386* (2019.01); *G06F 9/466* (2013.01); *G06F 16/23* (2019.01)

(58) Field of Classification Search
CPC ............. G06F 16/2386; G06F 16/2365; G06F 16/2379; G06F 16/23; G06F 16/2477; G06F 16/283; G06F 9/466; G06F 17/30; G06F 17/30592; G06F 11/1474; G06F 11/1662; G06F 11/1469; G06F 16/9024; G06F 16/00; G06F 17/30958; G06F 2201/835; G06F 11/1084; G06F 11/0727; G06F 11/0778; G06F 11/3006; G06F 17/30082; G06F 17/30008; G06F 17/30286

See application file for complete search history.

(56) References Cited

U.S. PATENT DOCUMENTS

| 7,653,665 | B1 | 1/2010 | Stefani et al. |
| 9,384,228 | B2 | 7/2016 | Zhang et al. |
| 2003/0078923 | A1* | 4/2003 | Voss ............... G06F 16/284 |
| | | | 707/999.007 |
| 2004/0107200 | A1 | 6/2004 | Sjogren et al. |

(Continued)

OTHER PUBLICATIONS

Unknown, "Improve performance of mixed OLTAP workloads with DB2 shadow tables," IBM, DeveloperWorks, Sep. 25, 2014, 9 pages.

*Primary Examiner* — Anh Ly
(74) *Attorney, Agent, or Firm* — Jared C. Chaney

(57) ABSTRACT

The present disclosure relates to a method for enforcing constraints on data in a data processing system. The method comprises providing a set of constraints on the data. A first data update request may be received at the transactional engine and executes on the first dataset. A second data update request associated with the received data update request is determined and sent by the transactional engine to the analytical engine. The analytical engine executes the second data, resulting in a set of changes in the second dataset. The transactional engine commits the update of the first dataset before or after receiving the results of the checking of the set of constraints. The update on the first dataset is aborted by the transactional engine in response to receiving the results of the checking of the set of constraints, wherein the results indicate that the set of constraints are not met.

11 Claims, 4 Drawing Sheets

(56) References Cited

U.S. PATENT DOCUMENTS

| | | | | |
|---|---|---|---|---|
| 2005/0065756 A1* | 3/2005 | Hanaman | G06Q 10/0875 | 707/E17.005 |
| 2008/0189438 A1* | 8/2008 | Zimmerer | H04L 67/2823 | 709/246 |
| 2009/0240663 A1* | 9/2009 | Plattner | G06F 16/2455 | 707/E17.005 |
| 2011/0252073 A1* | 10/2011 | Pauly | G06F 16/213 | 707/812 |
| 2014/0122439 A1* | 5/2014 | Faerber | G06F 16/215 | 707/683 |
| 2014/0250060 A1* | 9/2014 | Zhang | G06F 16/23 | 707/609 |
| 2014/0317048 A1* | 10/2014 | Wang | G06F 12/0891 | 707/607 |
| 2014/0365424 A1* | 12/2014 | Herbst | H04W 52/0209 | 707/607 |
| 2015/0074081 A1* | 3/2015 | Falter | G06F 16/2433 | 707/713 |
| 2015/0120698 A1* | 4/2015 | Plattner | G06F 16/283 | 707/714 |
| 2015/0356137 A1* | 12/2015 | Andros | G06F 16/2453 | 707/715 |
| 2016/0098425 A1* | 4/2016 | Brunswig | G06F 16/245 | 707/607 |
| 2017/0212934 A1* | 7/2017 | Plattner | G06F 16/2455 | |
| 2017/0329836 A1* | 11/2017 | Simitsis | G06F 16/283 | |

\* cited by examiner

OFFLOADING CONSTRAINT ENFORCEMENT IN A HYBRID DBMS

BACKGROUND

An embodiment of present invention relates to the field of digital computer systems, and more specifically, to a method for enforcing constraints on data in a data processing system.

Database management systems (DBMS) typically offer the possibility to define constraints on the database schema to which the managed data must adhere. It is the responsibility of the DBMS to enforce the defined constraints. Whenever it executes a data manipulation statement, it must check whether the constraints are still met after the change. If the constraints are not met, then the DBMS must reject the statement. For example, unique and referential constraints are not cheap to evaluate, as they must search an entire table for the existence of duplicate values or the referenced key, respectively. Thus there is need to improve the performance of such systems for evaluating the constraints.

SUMMARY

Various embodiments provide a method for enforcing constraints on data in a data processing system, a computer program product and computer system as described by the subject matter of the independent claims. Advantageous embodiments are described in the dependent claims. Embodiments of the present invention can be freely combined with each other if they are not mutually exclusive.

In one embodiment, the invention relates to a method for enforcing constraints on data in a data processing system, the data processing system comprising a transactional engine maintaining a first dataset and an analytical engine maintaining a second dataset, the second dataset comprising at least part of the first dataset. The method comprises providing a set of constraints on the data, receiving a first data update request at the transactional engine, executing the first data update request on the first dataset, determining a second data update request associated with the received data update request, sending by the transactional engine the second data update request to the analytical engine, checking by the analytical engine the set of constraints of the data on the second dataset, executing by the analytical engine the second data update request on the second dataset, resulting in a set of changes in the second dataset, committing by the analytical engine the set of changes in response to the set of constraints being met, otherwise aborting the set of changes, communicating by the analytical engine results of checking the set of constraints to the transactional engine, committing by the transactional engine the update of the first dataset before or after receiving the results of the checking of the set of constraints, aborting the update on the first dataset by the transactional engine in response to receiving the results of the checking of the set of constraints, and in case the results indicate that the set of constraints are not met.

In another embodiment, the invention relates to a computer program product comprising a computer-readable storage medium having computer-readable program code embodied therewith, the computer-readable program code configured to implement all of operations of the method according to preceding embodiments.

In another embodiment, the invention relates to a data processing system for enforcing constraints on data, the data processing system comprising a transactional engine maintaining a first dataset and an analytical engine maintaining a second dataset, the second dataset comprising at least part of the first dataset. The data processing system is configured for providing a set of constraints on the data, receiving a first data update request at the transactional engine, executing the first data update request on the first dataset, determining a second data update request associated with the received data update request, sending by the transactional engine the second data update request to the analytical engine, checking by the analytical engine the set of constraints of the data on the second dataset, executing by the analytical engine the second data update request on the second dataset, resulting in a set of changes in the second dataset, committing by the analytical engine the set of changes in response to the set of constraints being met, otherwise aborting the set of changes, communicating by the analytical engine results of checking the set of constraints to the transactional engine, committing by the transactional engine the update of the first dataset before or after receiving the results of the checking of the set of constraints, aborting the update on the first dataset by the transactional engine in response to receiving the results of the checking of the set of constraints, and in case the results indicate that the set of constraints are not met.

BRIEF DESCRIPTION OF THE DRAWINGS

In the following embodiments of the invention are explained in greater detail, by way of example only, making reference to the drawings in which.

DETAILED DESCRIPTION

Figure 1:
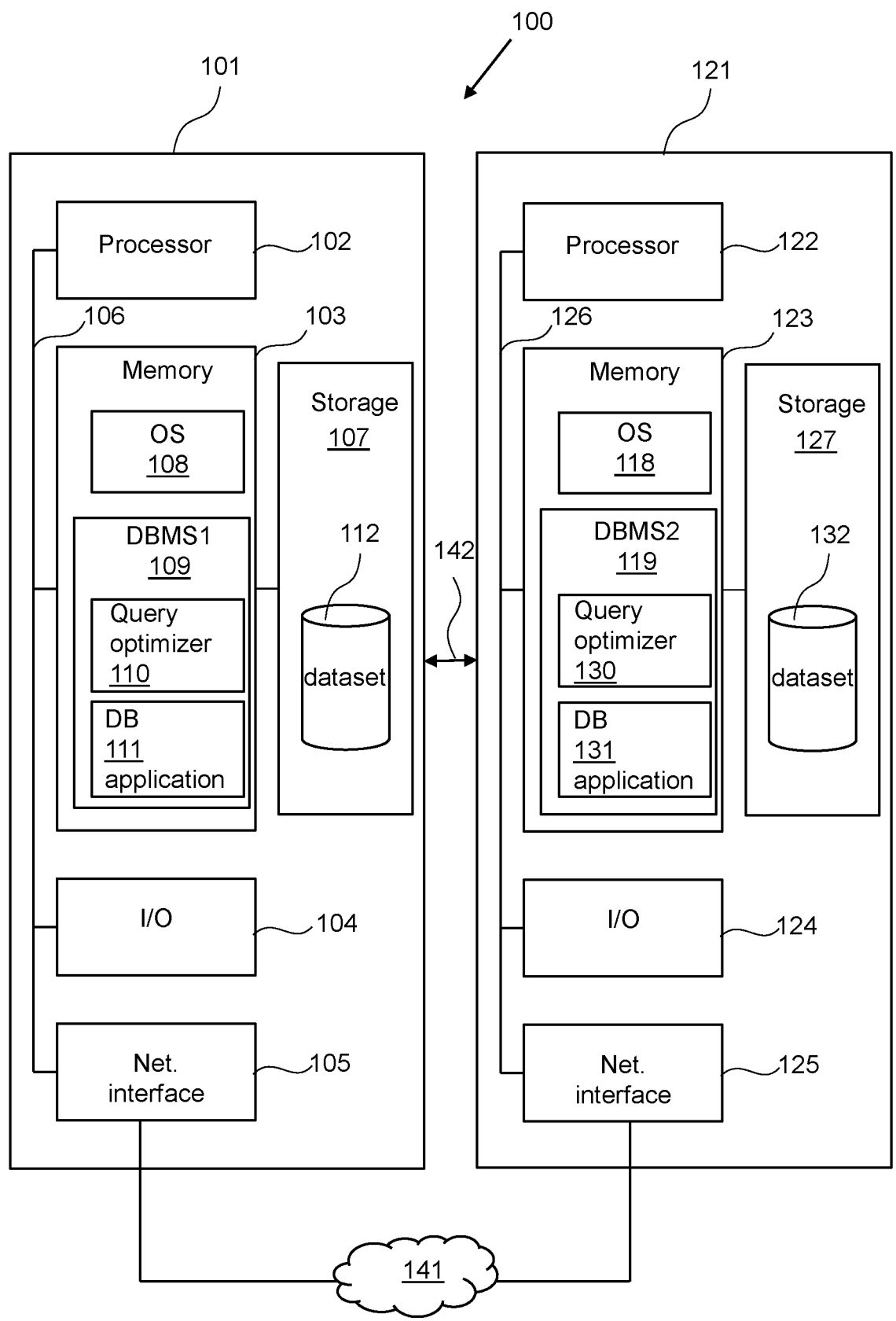
FIG. 1 depicts a data processing system according to an example of the present disclosure.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The data processing system may be a hybrid DBMS or may implement a hybrid DBMS. The data processing system may herein also be referred to hybrid DBMS. In order to address a multitude of workload types with different requirements and goals, the data processing system is composed from more than one execution engine (the transactional and analytical engines) such that each of the execution or database engine may have a respective set of resources adapted to run on the datasets available at execution engine. For example, the transactional engine may require less resources compared to the analytical engine as the first dataset may be smaller than the second dataset.

Each of the first data update request and second data update request may be a data manipulation statement encompassing a database statement, including queries. The data manipulation statement may be a data processing command. For example, the data manipulation statement is a Structured Query Language (SQL) statement, which performs a write operation (INSERT, UPDATE or DELETE) in a database table. The data manipulation statement may for example be part of one or more transactions.

A "transaction" or "database transaction" is a logical unit of database operations which are executed as a whole to process user requests. A transaction is a larger unit that includes and frames one or more statements. A transaction ensures that the action of the framed statements is atomic with respect to recovery.

The second dataset may comprise at least part of the first dataset and/or further additional data. The data processing system may be configured to replicate data from the transactional engine to the analytical engine e.g. using a replication mechanism or module of the data processing system. The first dataset may be the currently being stored dataset at the transactional engine (e.g. previous first datasets have been replicated and deleted). The second dataset may be generated from previous first datasets or from the previous first datasets and current first dataset. The previous first datasets are datasets that were maintained previously to the current first dataset by the transactional engine. The first and second datasets may for example have different structures. In one example, the first dataset may comprise at least part of the second dataset.

The checking by the analytical engine of the set of constraints of the data on the second dataset may be performed before and/or after and/or while the second data update request is executed. If for example a constraint is independent on the execution of the second data update request (i.e. the result of the check is not affected by the execution of the second data update request) it may be checked before or while executing the second data update request. If for example a constraint is dependent on the execution of the second data update request (i.e. the results of the check may depend on the execution such request) it may be checked before or while executing the second data update request.

In order to reduce the costs (both performance wise and financially) the present method enables to offload constraint enforcement in a hybrid DBMS to the analytical engine. To save the transactional engine from creating unnecessary (for the query workload) indexes for accessing the data in order to check the constraints. Instead, the analytical engine performs constraint enforcement for the columns or attributes in question. When new data enters the hybrid DBMS the data is also loaded into the analytical engine. Upon reception of data, the analytical engine checks the constraints in question and, in case of a violation, notifies the transactional engine. Thus, constraints enforcement is not carried in the transactional engine of a hybrid database, but in the analytical engine. There is no need to create or maintain indexes in the transactional engine for constraint enforcement. The constraints can thus be more complex than just row-level constraints as the analytical may have more processing resources to process complex constraints.

The act of committing is the act of making of a set of tentative changes preliminary or permanent. A state (e.g. flag) may for example be assigned to each commit indicating a preliminary state or permanent state of the commit. For example, the committing performed by the analytical engine is making the changes caused by the second data update request permanent. However, the transactional engine may perform a commit making the changes caused by the first data update request preliminary in case for example the transactional does not wait for the results of the checks to be received. In this case the changes caused by the first data update request may be made permanent (confirmed) when the transactional engine receives the results of the check that indicates that the set of constraints are met.

The aborting refers to discarding any modifications to one or more values in the first and/or second dataset caused by the execution of the first and second data update requests. For example, the aborting may comprise rolling back by the transactional engine (analytical engine) the changes caused by the execution of the first data update request (second data update request). For example, the rolling back is performed to obtain the latest version of the first (second) dataset as a current version of the first (second) dataset.

In another example, the aborting by the transactional engine may comprise requesting the user (e.g. callback) of the data processing system for corrections. For example, the user may define a compensation action that may be executed by the transactional engine to roll-back the change. In case the transactional engine has committed the changes before receiving the results that indicate the at least one constraint of the set of constraints is not met (data changes are committed even though there may be conflicts) the user may be asked to compensate by opening a new transaction to undo the previous changes.

The first data update request may for example be triggered by or caused by or received from one or more transactions (source transactions). The second data update request may be provided to the analytical engine as part of a transaction (target transaction) which may further comprise further instructions. The further instructions may for example indicate or require that the set of constraints are to be checked by the analytical engine and that the results of the check to be sent to the transactional engine.

The following listing is an example of constraints defined in a database schema in SQL language.

```
CREATE TABLE a (
  id INTEGER PRIMARY KEY, -- implies unique constraint
  x INTEGER UNIQUE -- unique constraint
)
CREATE TABLE b (
  id INTEGER,
  aid INTEGER FOREIGN KEY REFERENCES a.id, -- referential constraint
  x INTEGER,
  y INTEGER,
  CONSTRAINT pk_b PRIMARY KEY (id, aid)
)
```

It is the responsibility of a DBMS to enforce the defined constraints. Whenever it executes a data manipulation statement, it checks whether the constraints are still met after the change. If the constraints are not met, then the DBMS rejects the statement. Unique and referential constraints are not cheap to evaluate, as they search an entire table for the existence of duplicate values or the referenced key, respectively. For this reason, a DBMS typically creates indexes to speed up constraint enforcement searches. In the listing above at least three indexes would be created: one for each of the columns a.id, a.x, and (b.id, b.aid) if the constraints are to be evaluated at the transactional engine. The problem arises from the costs of the indexes that solely exist for constraint enforcement. The indexes do slow down data manipulation, as changes in the indexed data require the indexes to be updated as well. Assuming that a particular index created for constraint enforcement is not otherwise beneficial for the query workload, then the costs of maintaining the index generate significant performance impact if the data change rate is high. The present method overcomes such problem by offloading the constraints enforcement to the analytical engine.

According to one embodiment, the committing of the update of the first dataset is performed in response to receiving the results of the checking of the set of constraints indicating that the set of constraints are met. The committing performed by the transactional engine in this embodiment makes the changes caused by the first data update request permanent.

This embodiment may enable a synchronous constraint enforcement ensuring controlled and safe data changes. For example, the changes are committed if the results indicate that the set of constraints are met. This embodiment may particularly be advantageous in case of high number of data manipulations that can be executed in parallel. For example, large data manipulations, e.g., massive data loads, may take a relatively long time, so that the time required before committing by the transactional engine is small or negligible compared to that long time.

According to one embodiment, the committing of the update of the first dataset is performed before receiving the results of the checking of the set of constraints, wherein the aborting comprises undoing the changes caused by the execution of the first data update request and indicating that the committed changes by the transactional engine do not fulfil the set of constraints. This embodiment may enable an asynchronous constraint enforcement mode. This embodiment may be advantageous as it may not introduce delays for implementing data changes.

In the asynchronous enforcement mode, a commit state "preliminary committed" may be used. I order to access these kinds of rows having state "preliminary committed" a request may be explicitly performed in order to access these rows. For example, the state "preliminary committed" can be changed to a "rolled back" state in case of a violation of at least one constraint of the set of constraints. This changing of state can be performed by the data processing system by rolling back the change (e.g. using a before image), or by the user (e.g. callback), where the user defines a "compensation action" to roll-back the change. In other terms, in case there is a conflict (a constraint is not met), the user is asked to compensate by opening a new transaction to undo the previous change. The constraint check itself is done after the change is marked preliminary committed and applied. Then the check is done, which leads to changing the state to "committed" or "rolled back" (with user interaction or by using the before image).

The committing performed by the transactional engine in this embodiment makes the changes caused by the first data update request preliminary as the results of checking the set of constraints are not received yet. If the received results indicate that at least one constraint of the set of constraints is not met the changes caused by the execution of the first data update request may be undone and the commit may be canceled such that the changes are not permanent. If the received results indicate that the set of constraints are met the changes caused by the execution of the first data update request may be maintained and committed to make them permanent.

In one example, if the received results indicate that at least one constraint of the set of constraints is not met, the transactional engine may notify the client application that sent the first data update request asking it to take action and clean up the data to resolve the violation of the set of constraints. In this case, the preliminary commit may be maintained to become permanent if the client application has overcome the violation.

In another example, a hybrid mode that combines the low latency of asynchronous constraint enforcement with the consistency and durability of synchronous constraint enforcement may be used. At this, the transactional engine executes and preliminarily commits the first data update request immediately. Clients or transactions may declare to the data processing system that they are not willing the synchronous enforcement. To these transactions the performed modifications become immediately visible. The analytical engine catches up and executes the corresponding second data update request as well and checks the constraints. In any case the analytical engine reports the result to the transactional engine. If all constraints have been met, the transactional engine then commits the changes permanently. Transactions that require synchronous constraint enforcement only get to see the changes at this point in time. In case the constraints have been violated, these transactions do not get to see the changes. In case the client application is asked to resolve the violation, the data manipulation remains the preliminarily committed state until the violation has been resolved. Only then the analytical engine has reported that the constraints are met, the data manipulation is committed permanently and all other transaction get to see the changes.

According to one embodiment, the method further comprises setting a transaction isolation level such that transactions can access preliminarily committed data resulting from the committing of the update of the first dataset before receiving the results of the checking of the set of constraints.

In asynchronous and hybrid interaction mode a data manipulation statement can be in preliminarily committed state. Other statements, e.g., queries, may choose to see preliminarily committed changes in the same way as they may choose a particular transaction isolation level to see uncommitted changes or to accept other transactional anomalies. Thus, the existing isolation level syntax may be extended by a suitable directive, such as, e.g., WITH READ PRELIMINARILY COMMITTED in order to access the preliminarily committed data.

According to one embodiment, the committing of the update of the first dataset is performed at a predefined time indicated in the received first data update request. This embodiment may enable a controlled implementation of changes e.g. depending on the user needs.

According to one embodiment, the first data update request is received as part of a set of requests, the method further comprises performing each operation of the executing, determining sending, checking and executing operations on the whole set of requests at once. For example, the number of requests in the set is higher than a predefined threshold.

In other terms, the system does not enforce constraints after every single source transaction performed at the transactional engine. By contrast, several source transactions are batched, replicated to the analytical accelerator as a whole, and the constraints evaluated on the entire batch. This is expected to improve throughput greatly. In order to identify the source transaction which violated a constraint, the target transaction may be augmented so that every change (e.g., row to be inserted or deleted) is annotated with the identifier of the source transaction that caused the change. Moreover, all source transactions of a batch remain in the preliminary committed state at the transactional engine until the entire batch has been processed and the constraints validated. In case of a violation, the analytical engine identifies the causing source transactions and notifies the transactional engine. All other source transactions can then be committed permanently.

The transactional engine (and analytical engine starts) executing received requests (including the first data update request) once their number reaches the predefined threshold. This may save processing resources that would otherwise be required for executing common operations between the requests. For example, before a request is executed there may be an initialization operation that may be executed. For a group of requests this initialization may be executed at once instead of repeating it each time a request is received.

According to one embodiment, the set of constraints comprises conditions on at least one attribute of the attributes of the first dataset, wherein the second dataset comprises at least the data values of the at least one attribute.

For example the first dataset may comprise tables T1 to Tn and each table Ti may comprise columns or attributes. The constraint enforcement may be performed using (or require) data of one or more tables e.g. T1-T3 and it may require only part of the columns or attributes of the tables T1-T3. Offloading constraint enforcement is most practical if the respective tables (T1-T3) are part of or accessible by the analytical engine, i.e., both the transactional engine and the analytical engine own a copy of the tables T1-T3 (e.g. but in different structures). In order to offload constraint enforcement, it is sufficient if the analytical engine owns a copy of the columns required for constraint enforcement. If the workload on the hybrid DMBS does not require a full copy of the tables T1-T3 in question on the analytical engine, then an accelerator-only table may be defined that consists solely of the columns required to enforce the constraints and may be stored in or maintained by the analytical engine. Thus, in this case the analytical engine owns a copy of the table with only a subset of the columns. This reduces the required efforts to replicate the table and thus may reduce the latency of constraint enforcement.

According to one embodiment, the method further comprises: replicating to analytical engine the values of the at least one attribute before replicating the values of the remaining attributes of the first dataset to the analytical engine.

The replication may be performed by the transactional engine. For example, the values of the remaining attributes of the first dataset may be replicated after the check of the set of constraints is performed and the results (e.g. received from the analytical engine) of the check indicate that the set of constraints are met.

The hybrid DBMS may reduce the latency of constraint enforcement by replicating the required column values first. For accelerated tables (i.e., tables copy of which are both in the transactional and analytical engines), the system may choose not to replicate entire rows. By contrast, it may first replicate the column values required for constraint enforcement first, check the constraints, and only replicate the remaining column values at a later point in time. The analytical engine may, for example, already insert the values required for constraint enforcement into a data structure used to enforce the constraints, such as an index. When the remaining values are replicated, the hybrid DBMS may either send the full rows or send only the remaining columns and retrieve the other values from the data structure. This may require a sort of unique record identifier in this data structure.

Alternatively, the analytical engine may directly insert the column or attribute values required for constraint enforcement into an actual table and leave the values of the remaining columns undefined. At this, the analytical engine prevents the yet missing values to be accessed by other queries. The analytical engine may or may not allow queries that only reference the column values required for constraint enforcement to access these yet incomplete rows. The values of the remaining rows are inserted into the table later. Such partial replication of rows is particularly suitable for column-oriented systems, which store the values of each column in separate storage anyways.

According to one embodiment, the data processing system is a hybrid online transaction processing (OLTP) and online analytical processing (OLAP) database system, wherein the transactional engine is configured for performing OLTP processes, wherein the analytical engine is configured for performing OLAP processes. This embodiment may seamlessly be integrated in existing data warehouse systems.

According to one embodiment, the first dataset comprises records of a given table having an access frequency higher than a predefined access frequency threshold, the second dataset comprising records of the given table having an access frequency smaller than the predefined access frequency threshold.

According to one embodiment, the method is performed regardless of the amount of resources that are available within the transactional engine. This may have the advantage on relying on the data content and not on the available resources. For example, running on the second dataset may be advantageous compared to running on the first dataset although there are enough resources in the transactional engine as the second dataset may comprise more information than the first dataset.

FIG. 1 is a block diagram for a data processing system 100 for a hybrid DBMS suited for implementing method operations as involved in the disclosure. The data processing system 100 comprises a first computer system 101 (also referred to as transactional engine) connected to a second computer system 121 (also referred to as analytical engine or accelerator engine).

First computer system 101 includes processor 102, memory 103, input output (I/O) circuitry 104 and network interface 105 coupled together by bus 106.

Processor 102 may represent one or more processors (e.g. microprocessors). The memory 103 can include any one or combination of volatile memory elements (e.g., random access memory (RAM, such as dynamic access memory (DRAM), a static random access memory (SRAM), synchronous DRAM (SDRAM), etc.)) and nonvolatile memory elements (e.g., ROM, erasable programmable read only memory (EPROM), electronically erasable programmable read only memory (EEPROM), programmable read only memory (PROM).

Note that the memory 103 can have a distributed architecture, where various components are situated remote from one another, but can be accessed by the processor 102.

Memory 103 in combination with storage device 107 may be used for local data and instruction storage. In an embodiment, storage device 107 is a persistent storage device. Storage device 107 includes one or more persistent storage devices and media controlled by I/O circuitry 104. Storage device 107 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 103 may include one or more separate programs e.g. database management system DBMS1 109, each of which comprises an ordered listing of executable instructions for implementing logical functions, notably functions involved in embodiments of this invention. The software in memory 103 shall also typically include a suitable operating system (OS) 108. The OS 108 essentially controls the execution of other computer programs for implementing at least part of methods as described herein. DBMS1 109 comprises a database (DB) application 111 and a query optimizer 110. The DB application 111 may be configured for processing data stored in storage device 107. The query optimizer 110 may be configured for generating or defining query plans for executing queries e.g. on first dataset 112. The first dataset 112 may for example comprise transaction data that provides real time or near real time transaction data for OLTP analysis such as postings from a manufacturing control system.

Second computer system 121 includes processor 122, memory 123, I/O circuitry 124 and network interface 125 coupled together by bus 126.

Processor 122 may represent one or more processors (e.g. microprocessors). The memory 123 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 123 can have a distributed architecture, where various components are situated remote from one another, but can be accessed by the processor 122.

Memory 123 in combination with storage device 127 may be used for local data and instruction storage. In an embodiment, storage device 127 is a persistent storage device. Storage device 127 includes one or more persistent storage devices and media controlled by I/O circuitry 104. Storage device 127 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 123 may include one or more separate programs e.g. database management system DBMS2 119, each of which comprises an ordered listing of executable instructions for implementing logical functions, notably functions involved in embodiments of this invention. The software in memory 123 shall also typically include a suitable OS 118. The OS 118 essentially controls the execution of other computer programs for implementing at least part of methods as described herein. DBMS2 119 comprises a DB application 131 and a query optimizer 130. The DB application 131 may be configured for processing data stored in storage device 127. The query optimizer 130 may be configured for generating or defining query plans for executing queries e.g. on second dataset 132.

The first dataset 112 is the currently being used and stored dataset by the first computer system 101 any may for example be deleted from the first computer system 101 after a predefined time period, thus becoming previous first dataset. The second dataset 132 may be generated from a source dataset. The source dataset may comprise previous first datasets. In another example, the source dataset may comprise the previous first datasets and current first dataset 112. The previous first datasets are datasets that were previously stored (and are not anymore stored currently) in the first computer system 101 e.g. in a predefined previous time period.

The first and second datasets 112 and 132 may be stored in different format. The formats may differ in compression, row-oriented vs. column-oriented storage, etc.

For example, the second dataset 132 may be obtained by performing an Extract, Transform and Load (ETL) process on the source dataset. Data transformation may be accelerated using the second computer system 121. For example, data to be transformed does not necessarily have to be moved to another information integration server for transformation and cleansing purposes.

In another example, the second dataset 132 may be obtained by replicating or copying the source dataset from the first computer system 101 to the second computer system 121. The second dataset 132 may comprise the attributes of the first dataset 112. For example, the second dataset 132 may comprise for a given attribute more attribute values than attribute values of the given attribute in the first dataset 112.

First computer system 101 and second computer system 121 may be independent computer hardware platforms communicating through a high-speed connection 142 or a network 141 via network interfaces 105, 125. The network 141 may for example comprise a local area network (LAN), a general wide area network (WAN), and/or a public network (e.g., the Internet). Every computer system 101 and 121 is responsible for managing its own copies of the data.

Although shown in FIG. 1 as separate systems, the first and second computer systems may belong to a single system e.g. sharing a same memory and processor hardware, while each of the first and second computer systems is associated with a respective DBMS and datasets e.g. the two DBMSs may be stored in the shared memory. In another example, the two database management systems DBMS1 109 and DBMS2 119 may form part of a single DBMS that enables communications and method performed by DBMS1 109 and DBMS2 119 as described herein. The first and second datasets may be stored on a same storage or on separate storages.

The data processing system 100 may for example categorize every incoming query and execute it on the engine that meets these characteristics best. The first computer system 101 may be responsible for efficient lookup in transactional workloads (OLTP) and may be optimized for accessing limited amounts of data e.g. of the first dataset 112. The second computer system 121 may be responsible for data scans in the scope of analytical applications (OLAP), which require to read large amounts of data in a single query.

Figure 2:
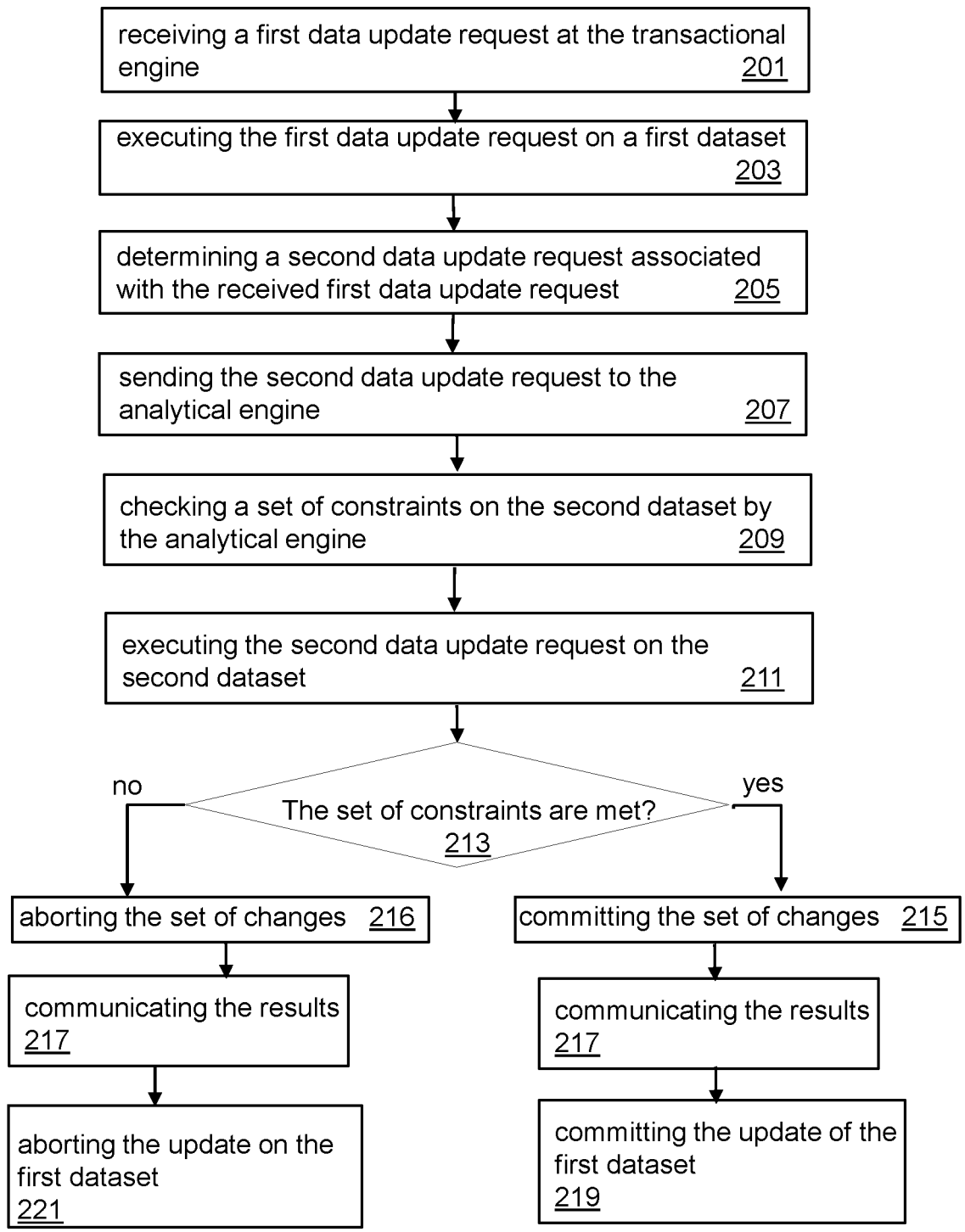
FIG. 2 is a flowchart of a method for enforcing a set of constraints on data in the data processing system according to an example of the present disclosure.

FIG. 2 is a flowchart of a method for enforcing a set of constraints on data in a data processing system e.g. 100. The data comprises at least part of the first and second datasets 112 and 132. The set of constraints may for example comprise unique constraints and referential constraints. Unique constraints require the values in one or more columns to exist only once. Referential constraints require primary-to-foreign key references across tables to be met, so that a given primary key values in a first table must really exist when a foreign key in a second table refers to it.

In operation 201, a first data update request may be received at the transactional engine 151. The first data update request may indicate or comprise the set of constraints. In another example, the set of constraints are provided separately from the received first data update request. The first data update request may for example comprise a request or statement indicative of an update to be executed on one or more columns of the first and/or second datasets 112 and 132. For example, the first update request may comprise an update command specifying one or more records to be updated. The update may comprise the insertion of new records and/or modifying existing records and/or deleting records.

In one example, the first data update request may be received from a user or client of the data processing system 100. In another example, the first data update request may automatically be generated by the transactional engine 151 e.g. on a periodic basis such as for cleaning old data etc. The term "user" may refer to an entity e.g., an individual, a computer, or an application executing on a computer e.g. that issues update requests.

In operation 203, the first data update request is executed on the first dataset 112 by a transactional engine 151. In an embodiment, first computer system 101 is transactional engine 151. This results in a modified first dataset. The transactional engine 151 receives the first data update request and executes it unconditionally. The execution in operation 203 of the first data update request does not cause the changes induced by such execution of the first data update request to be permanent. In other terms, the changes are preliminary until a final commit of the changes is performed the changes are then permanent. The preliminary state of the changes may be implemented by committing the changes by the transactional engine and assigning a state to the committed changes indicating that they are preliminary In operation 205, a second data update request associated with the received first data update request may be determined. The second data update request may be determined so as to be used by the analytical engine on the second dataset as the second dataset may have a different structure than the first dataset. The second data update request results in the same effect of the data manipulation performed by the transactional engine using the first data update request.

For example, the second update request may be generated or derived from the first data update such that it can be applied on the second dataset 132 in order to implement the changes as on the first dataset. The first and second datasets may comprise same data but structured differently. Therefore, the first data update request may be adapted such that it can be applied on the second dataset 132. With the second data update request it is not necessarily the same action or request as the first data update request, for instance, an update of the first data update request may have been decomposed into an insert and a delete operation. Or several updates of the first data update request may have been reduced to one.

In operation 207, the transactional engine 151 sends the second data update request to the analytical engine 161. This may for example be done via one of the replication mechanisms of the data processing system 100.

In operation 209, the analytical engine 161 checks the set of constraints of the data on the second dataset 132. The analytical engine 161 checks if the second dataset 132 fulfils the set of constraints.

In operation 211, the analytical engine 161 executes the second data update request on the second dataset. This results in a set of changes in the second dataset leading to a modified second dataset. Operation 209 may for example be executed after execution of the second data update request of operation 211 is performed. In another example, operations 209 and 211 may be performed in parallel e.g. in case the execution of the second data update request may not have impact on the check results.

In case all the set of constraints are met (inquiry 213) the analytical engine 161 commits the set of changes in operation 215. In an embodiment, second computer system 121 is analytical engine 161. Otherwise the analytical engine 161 aborts the set of changes in operation 216 if they are happened. The abort may for example be performed by undoing the set of changes (executed in operation 211) in the modified second dataset to obtain back the second dataset 132. In another example, the check of operation 209 may be performed before execution of operation 211 started. In this case the set of changes have not yet been implemented and the abort may comprise stopping or cancelling the execution of operation 211. The aborting may comprise aborting the whole transaction that comprises the second data update request.

In operation 217, communicates the results of checking the set of constraints to the transactional engine 151.

In operation 219, the transactional engine commits the update of the first dataset 112 (the modified first dataset). In other terms, the transactional engine commits the changes caused by the execution of the first data update request. In one example (see FIG. 3), operation 219 may be performed in response to receiving the results of checking the set of constraints and the results indicate that the set of constraints are met.

In another example, (see FIG. 4) operation 219 may be executed immediately after executing the first data update request by the transactional engine 151 in operation 203 e.g. without waiting for the results of the check to be received. In this case, the commit is a preliminary commit that would be confirmed or made permanent after receiving the results of the check that indicate that the set of constraints are met. In this case, a state in dictating "preliminary committed" state may be assigned to the committed data by the transactional engine.

In operation 221, the transactional engine 151 aborts the update on the first dataset in response to receiving the results of the checking of the set of constraints, wherein the results indicate that the set of constraints are not met. The aborting comprises undoing the changes caused by the execution of the first data update request of operation 203. In case operation 219 is executed by the transactional engine the aborting may comprise changing the state "preliminary committed" to "rolled back" state. For example, committing of operation 219 by the transactional engine may introduce a new version number of the first dataset (in "preliminary committed" state). And changing "preliminary committed" state to "rolled back" may comprise: deleting the current version of the first dataset and using the latest version the first dataset as the current version of first dataset (rollback that restores the "before image") or undoing the changes by asking for corrections from the user that provides a compensation action which then undoes the changes.

In one example, the aborting of operation 216 may comprise requesting from a user of the data processing system corrections. Upon receiving the corrections applying the corrections and checking again the set of constraints. If the set of constraints are met operations 217-221 may be performed.

In another example, the aborting of operation 221 may comprise requesting from a user of the data processing system corrections. Upon receiving the corrections applying the corrections.

Figure 3:
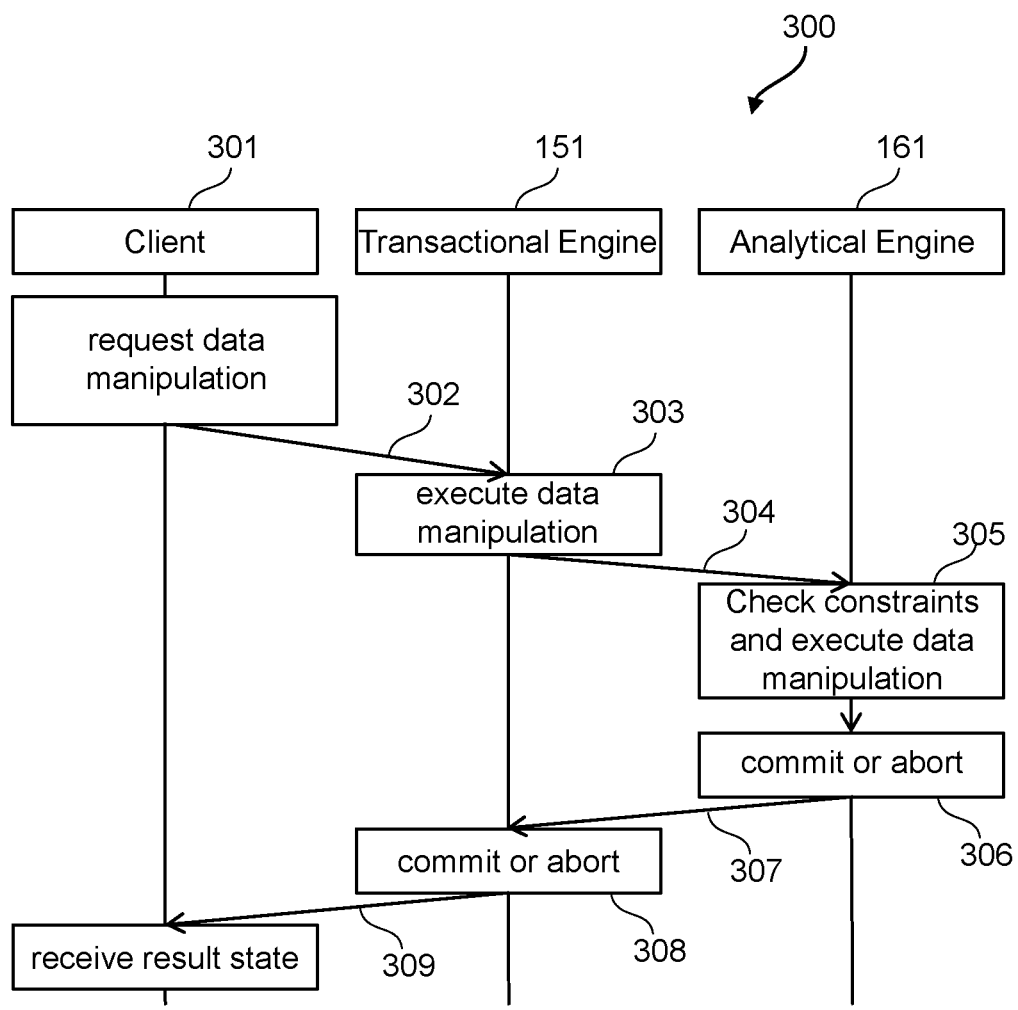
FIG. 3 is a flow diagram for an example method for enforcing a set of constraints on data in the data processing system according to an example of the present disclosure.

FIG. 3 is a flow diagram 300 for an example method for enforcing a set of constraints on data in a data processing system e.g. 100. The example of FIG. 3 provides a synchronous constraint enforcement. In synchronous constraint enforcement the transactional engine 151 delays the commit of the data manipulation until the analytical engine 161 has verified the set of constraints and receives the results of the verification, as sketched in FIG. 3.

A client 301 sends a request for data manipulation (302) to the transactional engine 151. The transactional engine 151 executes (303) the data manipulation request on the first dataset 112. The transactional engine 151 sends (304) to the analytical engine 161 another request to perform the data manipulation on the second dataset 132. The analytical engine 161 checks the set of constraints and executes (305) the received other request. Based on the results of the check, the analytical engine 161 commits or aborts (306) the data manipulation. If the results of the check indicate that the set of constraints are not met, the analytical engine 161 aborts the data manipulation. If the results of the check indicate that the set of constraints are met, the analytical engine 161 commits the data manipulation. The analytical engine 161 sends (307) the results of the check to the transactional engine 151. Based on check results, the transactional engine 151 commits or aborts (308) the data manipulation. If the results of the check indicate that the set of constraints are not met, the transactional engine 151 aborts the data manipulation. If the results of the check indicate that the set of constraints are met, the transactional engine 151 commits the data manipulation. The transactional engine 151 may send (309) a message to the client 301 indicating the state of the data manipulation. It may for example indicate whether the data manipulation is committed or aborted.

Figure 4:
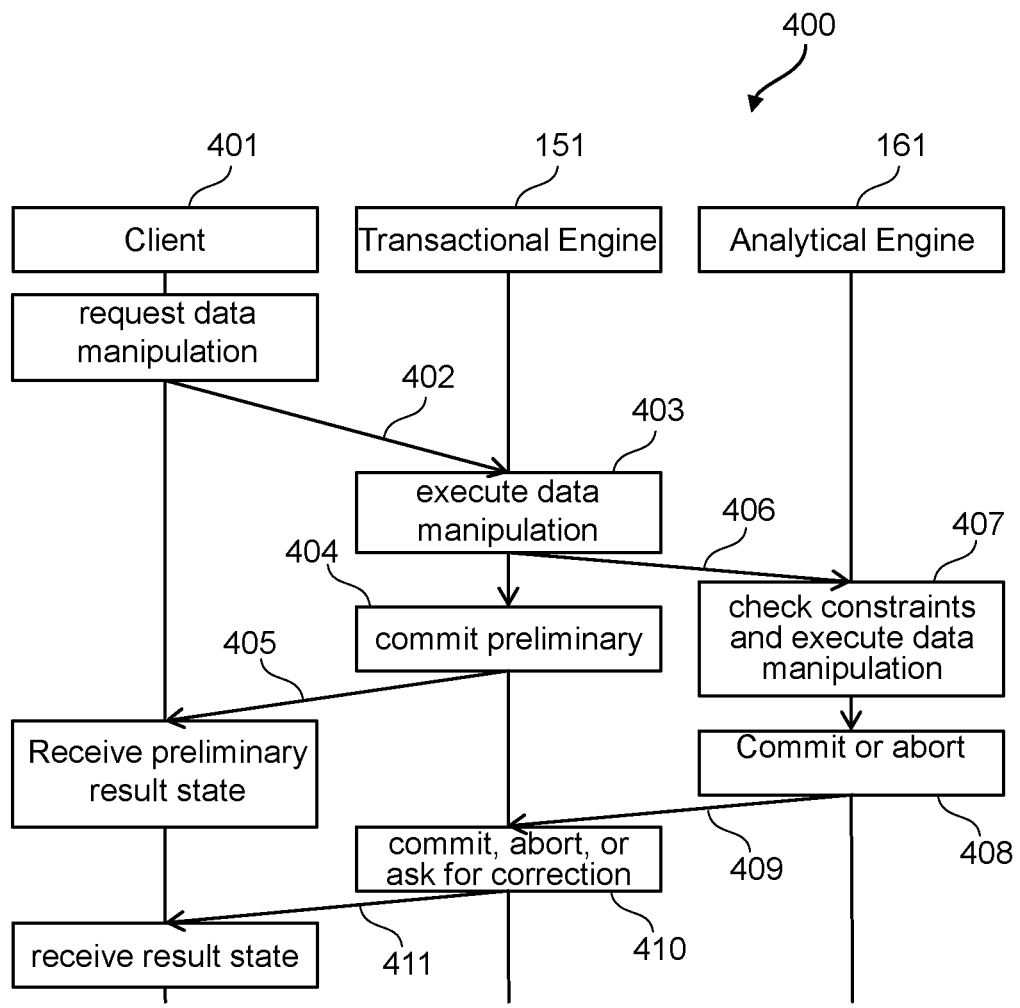
FIG. 4 is a flow diagram for another example method for enforcing a set of constraints on data in the data processing system according to an example of the present disclosure.

FIG. 4 is a flow diagram 400 for another example method for enforcing a set of constraints on data in a data processing system e.g. 100. The example of FIG. 4 provides an asynchronous constraint enforcement. In asynchronous constraint enforcement the transactional engine 151 executes the data manipulation unconditionally and commits it preliminarily without waiting for the analytical engine 161 to complete constraint enforcement, as sketched in FIG. 4.

A client 401 sends a request for data manipulation (402) to the transactional engine 151. The transactional engine 151 executes (403) the data manipulation request on the first dataset 112. The transactional engine 151 commits (404) the data manipulation, even before receiving the constraints check results from the analytical engine 161. For example, the transactional engine may introduce a commit state of "preliminarily committed" for committed data manipulation. The transactional engine 151 may send (405) a message to the client 401 indicating the state of the data manipulation. It may for example indicate that the data manipulation is committed preliminarily as other checks are still to be performed. The client 401 may use the data in "preliminarily committed" state.

The transactional engine 151 sends (406) to the analytical engine 161 another request to perform the data manipulation on the second dataset 132. The analytical engine 161 checks the set of constraints and executes (407) the received other request. Based on the results of the check, the analytical engine 161 commits or aborts (408) the data manipulation. If the results of the check indicate that the set of constraints are not met, the analytical engine 161 aborts the data manipulation. If the results of the check indicate that the set of constraints are met, the analytical engine 161 commits the data manipulation. The analytical engine 161 sends (409) the results of the check to the transactional engine 151. Based on check results, the transactional engine 151 aborts (410) the data manipulation or confirms the commit performed before. If the results of the check indicate that the set of constraints are not met, the transactional engine 151 aborts the data manipulation and the commit. If the results of the check indicate that the set of constraints are met, the transactional engine 151 maintains the commit of the data manipulation as permanent. The transactional engine 151 may send (411) a message to the client 401 indicating the state of the data manipulation. It may for example indicate whether the data manipulation is aborted or maintained committed. If the data manipulation is aborted the message may indicate that the committed changes shall be deleted upon request by the client 401.

In operation 410, the client 401 may be asked by the transactional engine for corrections in order to overcome the violation of the set of constraints. This may be advantageous as if the corrections are applied and the set of constraints are met the commit by the transactional engine may be maintained and made permanent.

The interaction mode in which a constraint is enforced on the analytical engine may be defined per data manipulation statement. The default interaction mode is synchronous constraint enforcement. In order to enable asynchronous and hybrid interaction mode, the applications programming interfaces (APIs). This way, callback functions can be registered more naturally in the particular programming language to receive preliminary and final result states as well as to resolve constraint violations.

In the following an example for enforcement locations/locus is described. In order to select the constraints that are to be enforced by the analytical engine, these constraints may be declared explicitly as such. The following second listing contains an example syntax (in SQL language) for this purpose. By appending the directive ENFORCED IN ACCELERATOR to the constraint definition, the constraint is marked for enforcement in the analytical engine. Constraints not marked this way continue to be enforced in the transactional engine. Different syntax are possible, let alone graphical user interfaces in a database design tool.

```
CREATE TABLE a (
id INTEGER PRIMARY KEY ENFORCED IN ACCELERATOR,
x INTEGER UNIQUE -- enforced in the transactional engine
)
CREATE TABLE b (
id INTEGER,
aid INTEGER FOREIGN KEY REFERENCES a.id ENFORCED IN ACCELERATOR,
x INTEGER,
y INTEGER,
CONSTRAINT pk_b PRIMARY KEY (id, aid) -- enforced in the transactional engine
)
```

Depending on the defined constraint enforcement location of a constraint, the hybrid DBMS creates the data structures required for constraint enforcement (e.g., unique indices) either in the transactional engine or in the analytical engine. As constraints typically cannot be altered in SQL database systems, changing the enforcement location of a constraint can only be done by dropping the constraint and recreating it with a different enforcement locus/location. This causes the required data structures being dropped on the old locus and recreated on the new locus.

Using the example given in the above second listing, it is sufficient of the analytical engine 161 to own a copy of the column a id in order to enforce the primary key (i.e., unique) constraint of table a.

In another example, a method for enforcing constraints on data in a data processing system is provided. The method comprises: providing a set of constraints on the data, executing a set of updates caused by transactions to a first instance of the data, the first instance of the data being maintained by a transactional engine of the data processing system, determining an associated set of updates for the set of updates and triggering an analytical engine of the data processing system to execute the associated set of updated to a second instance of the data, the second instance of the table being maintained by the analytical engine, the analytical engine carrying out at least the operation of checking of the set of constraints on the data of the following operations: checking the set of constraints of the data and executing the associated set of updates, the analytical engine committing the associated set of changes in response to the set of constraints being met, otherwise aborting the set of changes, the analytical engine communicating results of checking the set of constraints to the transactional engine, the transactional engine committing or aborting the set of updates on the first instance of the data in response to receiving the results of the checking of the set of constraints. In one example, the transactional engine may preliminary commit the set of updates on the first instance of the data in response to executing the set of updates and provide preliminary query results based on the preliminary committed data.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In an embodiment, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations according to an embodiment of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for enforcing constraints on data in a data processing system, the data processing system comprising a transactional engine maintaining a first dataset and an analytical engine maintaining a second dataset, the second dataset comprising at least part of the first dataset, the method comprising:
   providing a set of constraints on the data;
   receiving a first data update request at the transactional engine;
   executing the first data update request on the first dataset;
   determining a second data update request associated with the received data update request;
   sending, by the transactional engine, the second data update request to the analytical engine;
   checking, by the analytical engine, the set of constraints of the data on the second dataset;
   executing, by the analytical engine, the second data update request on the second dataset, resulting in a set of changes in the second dataset;
   committing, by the analytical engine, the set of changes in response to the set of constraints being met, otherwise aborting the set of changes;
   communicating, by the analytical engine, results of checking the set of constraints to the transactional engine;
   committing, by the transactional engine, an update of the first dataset before or after receiving the results of the checking of the set of constraints,
      wherein the committing of the update of the first dataset being performed before receiving the results of the checking of the set of constraints; and
   aborting the update on the first dataset, by the transactional engine, if the results indicate that the set of constraints are not met,
      wherein the aborting comprises undoing the set of changes caused by the execution of the first data update request and indicating that the committed set of changes, by the transactional engine, do not fulfil the set of constraints.

2. The method of claim 1, wherein the committing of the update of the first dataset is performed in response to receiving the results of the checking of the set of constraints indicating that the set of constraints are met.

3. The method of claim 1, further comprising setting a transaction isolation level such that transactions can access preliminarily committed data resulting from the committing of the update of the first dataset before receiving the results of the checking of the set of constraints.

4. The method of claim 1, wherein the committing of the update of the first dataset being performed at a predefined time indicated in the received first data update request.

5. The method of claim 1, wherein the first data update request being received as part of a set of requests, the method further comprising performing each operation of the executing, determining, sending, checking and executing operations on a whole set of requests at once.

6. The method of claim 1, wherein the set of constraints comprises conditions on at least one attribute of the attributes of the first dataset, wherein the second dataset comprises at least a first set data values of the at least one attribute.

7. The method of claim 6 further comprising replicating, by the transactional engine to the analytical engine, the first set of data values of the at least one attribute before replicating a second set of data values of the remaining attributes of the first dataset to the analytical engine.

8. The method of claim 1, wherein the data processing system is a hybrid online transaction processing (OLTP) and online analytical processing (OLAP) database system, wherein the transactional engine is configured for performing OLTP processes, wherein the analytical engine is configured for performing OLAP processes.

9. The method of claim 1, wherein the transactional engine has a limited amount of resources.

10. A data processing system for enforcing constraints on data, the data processing system comprising a transactional engine maintaining a first dataset and an analytical engine maintaining a second dataset, the second dataset comprising at least part of the first dataset, the data processing system being configured for:
   providing a set of constraints on the data;
   receiving a first data update request at the transactional engine;
   executing the first data update request on the first dataset;
   determining a second data update request associated with the received data update request;
   sending, by the transactional engine, the second data update request to the analytical engine;
   checking, by the analytical engine, the set of constraints of the data on the second dataset;
   executing, by the analytical engine, the second data update request on the second dataset, resulting in a set of changes in the second dataset;
   committing, by the analytical engine, the set of changes in response to the set of constraints being met, otherwise aborting the set of changes;
   communicating, by the analytical engine, results of checking the set of constraints to the transactional engine;
   committing, by the transactional engine, the update of the first dataset before or after receiving the results of the checking of the set of constraints,
      wherein the committing of the update of the first dataset being performed before receiving the results of the checking of the set of constraints; and
   aborting the update on the first dataset, by the transactional engine, in response to receiving the results of the checking of the set of constraints and in case the results indicate that the set of constraints are not met,
      wherein the aborting comprises undoing the set of changes caused by the execution of the first data update request and indicating that the committed set of changes, by the transactional engine, do not fulfil the set of constraints.

11. A computer program product comprising a non-transitory computer readable storage medium having program instructions embodied therewith, the program instructions executable by a processor to cause the processor to perform a method comprising:
   providing a set of constraints on the data;
   receiving a first data update request at the transactional engine;
   executing the first data update request on the first dataset;
   determining a second data update request associated with the received data update request;
   sending, by the transactional engine, the second data update request to the analytical engine;
   checking, by the analytical engine, the set of constraints of the data on the second dataset;
   executing, by the analytical engine, the second data update request on the second dataset, resulting in a set of changes in the second dataset;
   committing, by the analytical engine, the set of changes in response to the set of constraints being met, otherwise aborting the set of changes;
   communicating, by the analytical engine, results of checking the set of constraints to the transactional engine;
   committing, by the transactional engine, the update of the first dataset before or after receiving the results of the checking of the set of constraints,
      wherein the committing of the update of the first dataset being performed before receiving the results of the checking of the set of constraints; and
   aborting the update on the first dataset, by the transactional engine, in response to receiving the results of the checking of the set of constraints and in case the results indicate that the set of constraints are not met,
      wherein the aborting comprises undoing the set of changes caused by the execution of the first data update request and indicating that the committed set of changes, by the transactional engine, do not fulfil the set of constraints.

* * * * *